United States Patent [19]

Rogers

[11] Patent Number: 5,198,039
[45] Date of Patent: Mar. 30, 1993

[54] APPARATUS AND METHOD FOR AUTOMATICALLY POSITIONING AND OPERATING NON-CONTACT TOOL HOLDERS

[75] Inventor: Thomas W. Rogers, Germantown, Wis.

[73] Assignee: Messer Griesheim Industries, Inc., Valley Forge, Pa.

[21] Appl. No.: 879,482

[22] Filed: May 7, 1992

[51] Int. Cl.⁵ .............................................. B23K 7/10
[52] U.S. Cl. ...................................... 148/194; 266/69; 266/77
[58] Field of Search ................. 148/205, 194; 266/48, 266/69, 77, 49, 58

[56] References Cited

U.S. PATENT DOCUMENTS

| | | | |
|---|---|---|---|
| 3,445,102 | 5/1969 | Roder | 266/69 |
| 3,591,157 | 7/1971 | Culp, Jr. | 266/77 |
| 3,866,892 | 2/1975 | Hooper | 266/69 |
| 4,132,392 | 1/1979 | Hooper | 266/69 |
| 4,372,538 | 2/1983 | Balfanz | 266/69 |

FOREIGN PATENT DOCUMENTS

0138565  8/1983  Japan .................................. 266/69

Primary Examiner—Scott Kastler
Attorney, Agent, or Firm—Andrus, Sceales, Starke & Sawall

[57] ABSTRACT

Multiple cutting torches are automatically spaced along a torch bar operating parallel to a main beam spanning a cutting table with an apparatus and method allowing one or all of the cutting torches to be stored completely outside the cutting table when not in use, thereby retaining the entire cutting table width for effective access by the remaining operative cutting torches. This eliminates the need to have an extended main beam length simply to accommodate cutting torch storage. The torch bar provides primary support for the torch carriages and includes an end storage portion which can be moved laterally beyond the end of the main beam from which one or all of the cutting torches may be retrieved for subsequent programmed spacing and cutting operation.

7 Claims, 2 Drawing Sheets

APPARATUS AND METHOD FOR AUTOMATICALLY POSITIONING AND OPERATING NON-CONTACT TOOL HOLDERS

BACKGROUND OF THE INVENTION

The present invention relates to an apparatus and its method of operation for mounting and spacing a plurality of tool holders along a main beam spanning a work table and, more particularly, to an apparatus and method for automatically spacing the tools in an operative position and for returning the tools to an inoperative stowed position completely outside the work space on the work table.

Non-contact tools, such as oxyfuel or plasma cutting torches, are used in a variety of applications where a plurality of tools are mounted to a carriage for movement relative to a work piece to be operated upon. In particular, cutting torches are used to cut a variety of sizes and shapes from a metal plate. The plate is generally supported on a work table and a bank of cutting torches is supported by a main overhead beam which, in turn, is attached to a carriage for programmed cutting movement over the plate supported on the work table. A plurality of cutting torch holders is typically used so that multiple identical pieces may be cut simultaneously with the torches positioned in spaced relation along the main beam and across the full width of the work table. The number of pieces cut from a plate in any one operation varies and, when fewer than all of the cutting torches are needed, those not being used are stowed in an inoperative position on one end of the beam. Inoperative torch holders which are stored at one end of the main beam either continue to occupy space above the work table, thereby decreasing the effective work space available, or require an extended main beam so that the unused torches may be stored laterally outside of the work space. In the latter case, extension of the main beam merely to provide additional storage space and to preserve full usable work space is both costly and requires additional floor space.

U.S. Pat. No. 3,591,157 shows a system for automatic programmed spacing of multiple cutting torches in which the torches are mounted on a laterally reciprocable control bar which is driven by a programmed master carriage offset to one side of the cutting table. The cutting torches are alternately clamped to and released from a stationary bar parallel to the control bar and the control bar itself to allow initial programmed spacing of the torches and to then allow the cutting torches to follow the cutting pattern in unison. A substantial portion of the cutting apparatus extends far beyond one lateral edge of the cutting table and any unused stored torch holders would be positioned over the cutting table.

U.S. Pat. No. 4,132,392 shows a multi-torch cutting system which utilizes a separate torch bar mounted parallel to the main beam for movement therealong, which torch bar carries the multiple torch heads for selectively positionable spacing along the bar. A master carriage is drivingly attached to the main beam and may be selectively clamped to the torch bar to carry the torch bar and attached torch holders along the main beam, or unclamped from the torch bar so that movement of the carriage along the main beam may be utilized to sequentially engage torch holders which are unclamped from the torch bar to stack them on one end thereof for storage. The torch holders and master carriage are manually clamped to and unclamped from the torch bar and no mechanism for providing programmed torch spacing is shown.

U.S. Pat. No. 4,372,538 shows a multi-torch cutting system in which one torch carriage comprises a master carriage to which is attached the ends of a continuous positioning band which is trained around idler pulleys on opposite ends of the main beam. Movement of the master carriage along the main beam carries the band therewith and the remaining torch holders may be selectively and sequentially clamped to the moving band to establish a desirable variable torch spacing. Unused inoperative torches may be stored at one end of the main beam, but they would be positioned above the work table and prevent movement of any remaining operating torches over the work table in this area.

SUMMARY OF THE INVENTION

In accordance with the present invention, there is provided an apparatus and method of operation which allows automatic programmed spacing of multiple cutting torches and subsequent stacking of the cutting torches laterally entirely beyond the effective work space over the work table without extending the length of the main beam to provide torch storage space. The system can be used with other non-contact or contact tools.

The apparatus includes a torch bar mounted parallel to the main beam for movement therealong so that one end portion of the torch bar may be positioned beyond the end of the beam and beyond the effective work space to provide a tool storing position. A master carriage is mounted to be driven along the main beam and to simultaneously move along the torch bar. The torch bar may be releasably clamped to the main beam, and the master carriage may be releasably clamped to the torch bar, such that driven movement of the master carriage may be along and relative to the torch bar or may carry the torch bar with it. The master carriage also has attached thereto the opposite ends of a continuous band, the intermediate portion of which is wrapped around a pair of idler pulleys mounted on opposite ends of the torch bar so that driven movement of the master carriage relative to the torch bar carries the band for relative movement along the torch bar as well. Cutting torch holders are mounted individually for movement along the torch bar and the band and are positioned along the torch bar between the master carriage and the end of the torch bar defining the torch storing position. Each of the torch holders may be separately clamped to a torch bar or to the band to respectively hold the torches in their operative positions for cutting and to allow the torch holders to be moved into the operative positions during a programmed torch spacing sequence or to be returned to the storing position at the end of the torch bar in a stacking sequence. Appropriate programmable control means are provided for operation of the master carriage drive and selective operation of each of the various means by which certain elements are the apparatus are releasably clamped to other elements.

DETAILED DESCRIPTION OF THE PREFERRED EMBODIMENT

Figure 1A:
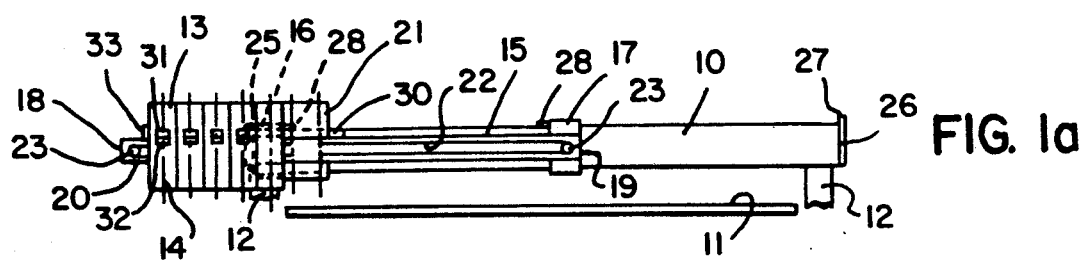
FIGS. 1a, 1b 1c 1d 1e 1f and 1g all show schematic representations of the apparatus of the present invention showing the sequential programmed cutting torch spacing operation.

Referring first to FIGS. 1a through 1g, the apparatus of the present invention and its mode of operation will be described with respect to a preferred embodiment in which it is utilized to mount and position a group of oxyfuel cutting torches above a cutting table to cut multiple shapes simultaneously from a large metal plate disposed below the torches. This system could be used as well, however, to carry plasma cutting torches or some other type of non-contact tools. The entire apparatus is supported on a main beam 10 which spans a work table 11 and is supported on opposite lateral sides of the work table on a pair of carriages 12. The carriages typically are mounted to be driven along a pair of parallel rails (not shown) positioned along the opposite lateral edges of the work table 11. A plurality of torch holders 13, each of which carries an oxyfuel cutting torch 14 are mounted for movement along the main beam 10 for programmed spacing in cutting positions, movement laterally across the work table 11 and longitudinally thereover for cutting operation, and for automatic return to a storage position between order changes.

A torch bar 15 is mounted parallel to the main beam 10 and attached to the beam for movement therealong. The torch bar 15 includes spaced first and second slave carriages 16 and 17, respectively, which are mounted to slide or roll freely along the main beam 10 with any convenient type of mounting system known in the prior art. The first slave carriage 16 is mounted inwardly from a first end 18 of the torch bar 15 to define between the first slave carriage and the end 18 and end storage portion 20.

A master carriage 21 is mounted on the main beam 10 and includes an appropriate drive apparatus to drive the master carriage along the beam. For example and as is well known in the prior art, a toothed rack may be mounted along the entire length of the main beam 10 and is engaged by a pinion attached to a drive motor carried by the master carriage. The master carriage 21 is also mounted for movement along the torch bar 15. The systems by which the master carriage 21 is mounted to the main beam 10 and to the torch bar 14 may include any of the sliding or rolling mounting systems well known in the prior art.

A positioning band 22 is mounted on the torch bar 15 to extend around idler pulleys 23 mounted on the first and second ends 18 and 19 of the bar. The ends of the band 22 are attached to the master carriage 21 so that relative movement of the master carriage along the torch bar 15 also carries the band for relative movement with respect to the torch bar. The band is preferably made of stainless steel and must be strong enough to carry the torch assemblies, as will be described hereinafter.

A plurality of torch carriages 13 are mounted for movement along the torch bar 15 with suitable sliding or rolling carriage mounting systems, also of a type well known in the art. As may be seen from the drawing, all of the torch carriages 13 are mounted on one side of the master carriage 21, between the carriage and the first end 18 of the torch bar. The first end 24 of the main beam 10 is provided with a suitable stop 25 to prevent movement of the first slave carriage 16 laterally beyond the end of the main beam. The stop 25 preferably includes a limit switch to shutoff the master carriage drive and may also include a spring biased overtravel switch as a backup. The opposite second end 26 of the main beam is similarly provided with a stop 27 to limit travel of the second slave carriage 17 supporting the other end of the torch bar 15. When the torch bar 15 has traveled along the main beam to the first end 24, with the first slave carriage 16 engaging the stop 25, the end storage portion 20 of the torch bar extends laterally beyond the end of the beam and beyond the edge of the work table 11 as shown in FIGS. 1a-1g.

Each of the first and second slave carriages 16 and 17 may include a clamp 28 for releasably clamping the torch bar 15 to the main beam 10. However, only one clamp 28 is necessary and preferably it is attached to the second slave carriage 17. Thus, if the torch bar is clamped to the main beam the master carriage 21 will simultaneously move along the main beam 10 and the torch bar 15 as the master carriage is driven. On the other hand, if the clamps 28 are released and movement of the master carriage causes it to engage a slave carriage or a clamped torch carriage, the torch bar will move along the main beam with movement of the master carriage.

The master carriage 21 also includes a clamp 30 by which it may be releasably clamped to the torch bar 15. By clamping the master carriage to the torch bar the torch bar will be carried with the master carriage as it is driven along the main beam 10. This clamped mode is the manner in which the torch bar 15 and suitably spaced torch holders 13 are made to traverse the main beam in the operational cutting mode, as shown particularly in FIG. 2a.

Each of the torch carriages 13 includes a pair of clamps 31 and 32 for, respectively, releasably clamping the torch carriage to the torch bar 15 and for releasably clamping the torch carriage to a positioning band 22. By activating torch carriage clamp 31, the torch carriage will move with the torch bar 15. When clamp 31 is released and torch carriage clamp 32 is activated to engage the band 22, the torch carriage 13 will move along the torch bar 15 in response to driven movement of the master carriage 21.

In the prior art, the master carriage and the torch carriages have been clamped manually to the torch bar. In the system of this invention, automatic clamping of master carriage clamp 30 and torch carriage clamps 31 on the torch bar are provided.

Programmed control is provided to selectively operate the master carriage drive and each of the previously described clamps 28, 30, 31 and 32 to selectively position the torch carriages 13 along the torch bar 15 between a stored position with the torch carriages stacked on the end portion 20 of the torch bar and an operating position with the master carriage 21 and at least one torch carriage 13 spaced along the portion of the torch bar between the first and second slave carriages 16 and 17. The programmable control is also utilized to move the torch bar 15 along the main beam 10 between the torch storing position and an operative position with the active portion of the torch bar 15 operating above the work table 11 between the limits of the main beam carriages 12.

Referring again to FIG. 1, the sequence of programmed torch spacing will now be described. In FIG.

1a, all of the torch carriages 13 are positioned on the end storage portion 20 of the torch bar 15 and the torch bar is in its extreme lateral position on the main beam 10 such that the end portion and the torch carriages are all positioned laterally beyond the work table 11. In this position, the torch bar 15 is clamped via clamps 28 on the slave carriages 16 and 17 to the main beam 10. All of the torch carriage clamps 31 are clamped to the torch bar 15 and the torch carriage clamps 32 are unclamped from the positioning band 22. The master carriage clamp 30 is unclamped from the torch bar 15. In this state, the system is ready for the automatic torch spacing sequence.

Figure 1B:
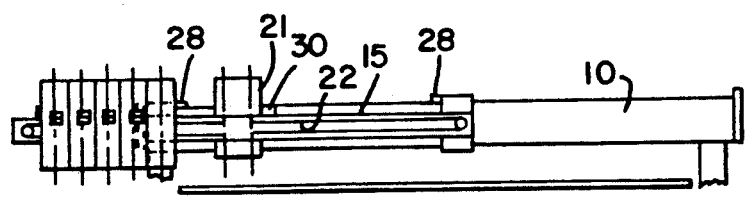
Figure 1C:
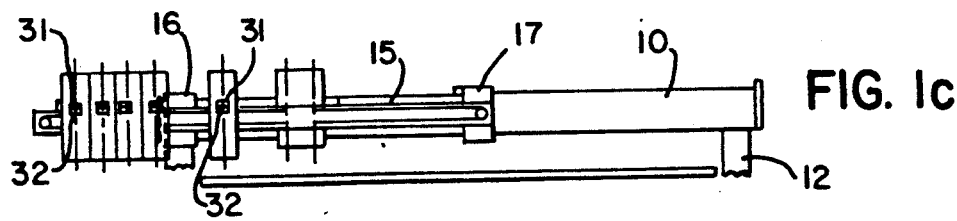
Figure 1D:
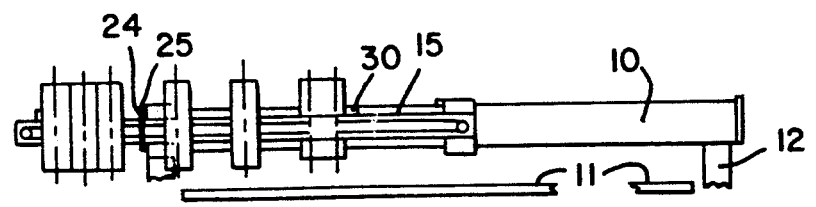
Figure 1E:
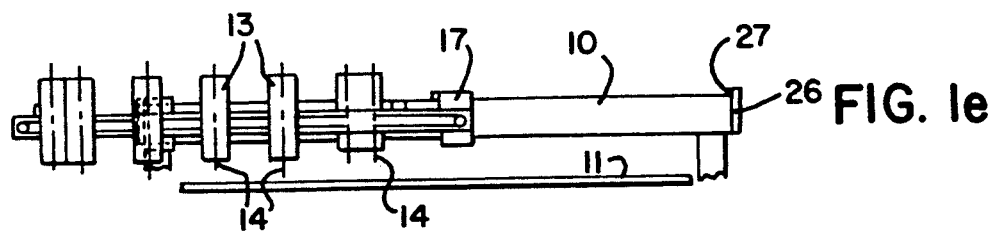
Figure 1F:
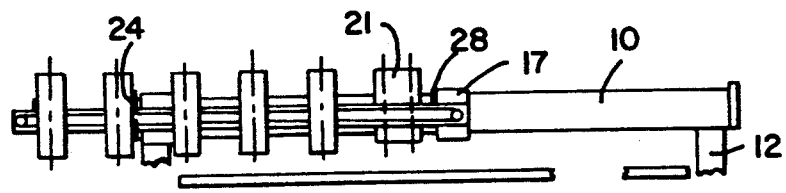
Figure 1G:
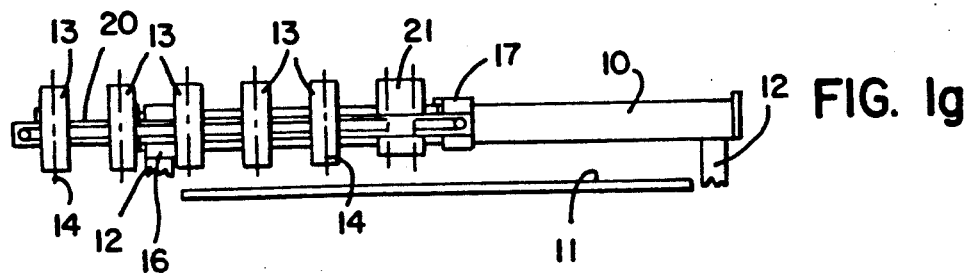
Figure 2A:
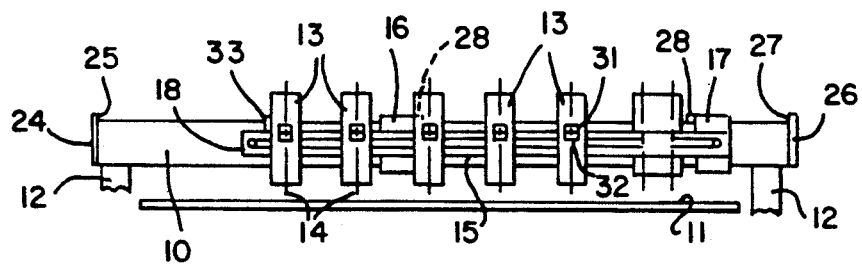
FIGS. 2a 2b 2c 2d 2e 2f and 2g all show schematic representations similar to FIG. 1 showing the sequence of automatic return of the cutting torches and their stacking in the stored position.

In FIG. 1b, the master carriage 21 is driven to the right a distance equal to the desired spacing between the master carriage and the immediately adjacent torch carriage 13. It should be noted that the master carriage typically carries two cutting torches 14, but only one torch may typically be used. After the master carriage 21 has reached the initial distance, the clamp 32 of the immediately adjacent torch carriage 13 is activated to clamp the torch carriage to the band 22 and the torch carriage clamp 31 is unclamped from the torch bar 15. The master carriage 21 then moves another distance equal to the distance it originally moved away from the immediately adjacent torch carriage 13, carrying with it the immediately adjacent torch carriage which is now clamped to the positioning band 22. The immediately preceding step is repeated for each next adjacent torch carriage 13 as shown in FIGS. 1d-1f, until the five torch carriages and the master carriage are spaced along the torch bar by equal amounts. Master carriage clamp 30 is then activated to clamp the master carriage to the torch bar 15 and the torch bar is unclamped from the main beam 10 by opening slave carriage clamps 28. Each of the torch carriages 13 is then clamped to the torch bar 15 by operation of clamps 31. The master carriage drive then operates to move the relatively fixed subassembly including the master carriage 21, torch bar 15 and torch carriages 13 to the right into operative position above the work table 11, as shown in FIG. 2a.

When the cutting process has been completed and it is desired to return the torches to the stored position on the end portion 20 of the torch bar 15 and also return the torch bar end portion to the storage position outwardly of the first end 24 of the main beam, the stacking sequence shown in FIG. 2 is undertaken. Referring first to FIG. 2a, all of the torch carriages 13 are unclamped from the torch bar 15 by opening clamps 31. Simultaneously, the master carriage clamp 30 is also opened to unclamp the master carriage from the torch bar. The torch carriages 13 continue to remain unclamped from the positioning band 22.

Figure 2B:
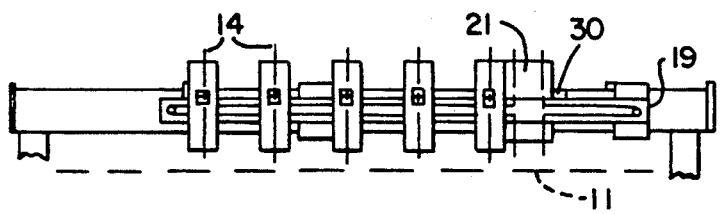
Figure 2C:
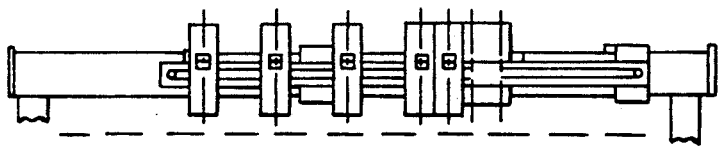
Figure 2D:
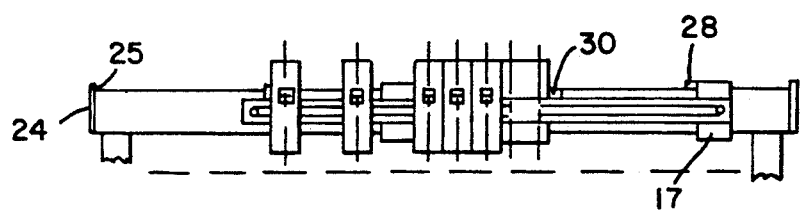
Figure 2E:
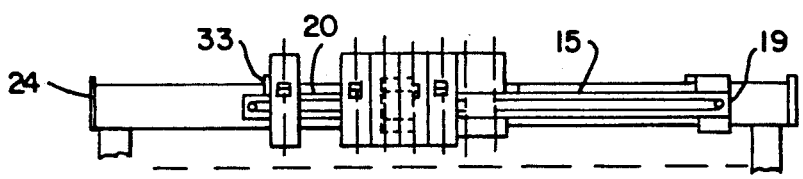
Figure 2F:
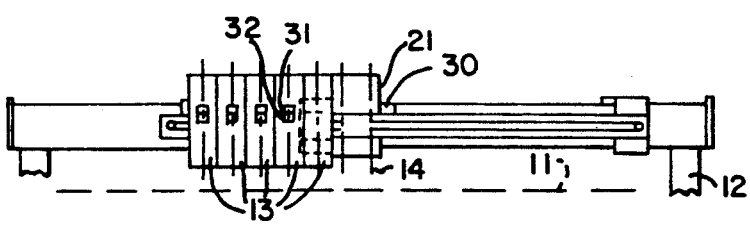
Figure 2G:
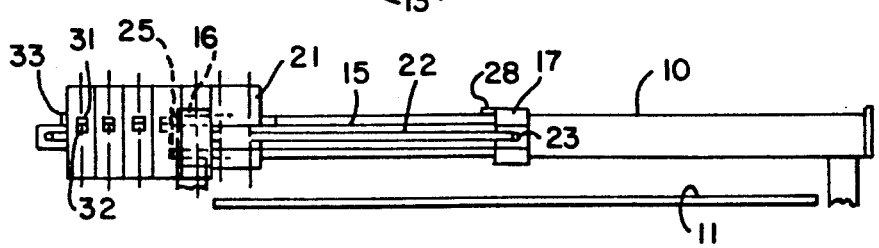

Continuing on to FIG. 2b, the master carriage 21 is driven to the left into engagement with the immediately adjacent torch carriage 13, the two carriages 21 and 13 continue moving together to the left to engage the next adjacent torch carriage, and the process continues until the master carriage has driven the stack of all but the end most torch carriage 13 (FIG. 2e) into engagement with the end most torch carriage (FIG. 2f) which is restricted from movement to the left along the torch bar 15 by the stop 33 on the first end 18. At this point, continued driving movement of the master carriage 21 carries the torch bar 15 and integrally attached slave carriages 16 and 17 because the slave carriage clamps 28 are unclamped. The entire assembly continues to move along the main beam until the first slave carriage 16 engages the limit switch forming a part of stop 25 on the first end of the main beam 10. Activation of the limit switch deactivates the master carriage drive and the torch carriages 13 are all stacked in the stored position from which they can be prepared for programmed respacing as previously described beginning with FIG. 1a.

The torch spacing process shown in FIG. 1 may be readily programmed for microprocessor control. Similarly, the torch stacking and storage sequence shown and described with respect to FIG. 2 may be similarly controlled. The torch bar 15 as shown in the drawings is somewhat shorter in length than the main beam 10. However, should more torch carriages 13 be needed, the end storage portion 20 of the torch bar would be correspondingly extended to any desired length. However, the remaining portion of the torch bar 15 between the first slave carriage 16 and the second slave carriage 17 must of necessity be shorter than the main beam 10 to provide for movement of the torch bar back and forth along the main during the programmed cutting sequence.

An alternate torch stacking and storage sequence from that shown in FIG. 2 may also be utilized. Referring to the position shown in FIG. 2a, with all torch carriages 13 clamped to the torch bar 15, the master carriage 21 may be moved along the main beam 10 to carry the torch bar and torch carriages to the full left storage position without changing the torch spacing. When torch bar movement is halted by engagement of the first slave carriage 16 with stop 25, all but the outer end most torch carriage 13 in engagement with stop 33 are unclamped from the torch bar and clamped to the positioning band 22 by opening clamps 31 and closing clamps 32. The master carriage 21 is then moved in the opposite direction (to the right) and the torch carriage 13 immediately adjacent the end most torch carriage unclamps from the band 22 and clamps to the torch bar 15. The master carriage continues to move to the right by incremental distances equal to the torch carriage spacing, each time picking up the next closest torch carriage 13 until all of the torch carriages have been stacked together. With all of the torch carriages unclamped from the band 22, movement of the master carriage in the reverse direction (to the left) causes the master carriage to engage the immediately adjacent torch carriage 13, as shown in FIG. 2f, and from there carries the torch carriages and torch bar 15 to the storage position shown in FIG. 2g.

Various modes of carrying out the present invention are contemplated as being within the scope of the following claims particularly pointing out and distinctly claiming the subject matter which is regarded as the invention.

I claim:

1. An apparatus for mounting and spacing a plurality of tool holders along a main beam disposed above and spanning a work table having an effective work space between the ends of the beam, said apparatus comprising:

a tool bar mounted parallel to and for movement along the main beam;

first stop means for limiting movement of the tool bar beyond one end of the beam to position one end portion of the tool bar in a tool storing position laterally beyond the table work space;

first clamping means for releasably clamping the tool bar to the main beam;

a master carriage mounted for movement along the main beam;

drive means for driving the master carriage along the main beam;

said master carriage mounted for movement along the tool bar in response to clamping said first clamping means and operation of said drive means;

second clamping means for releasably clamping the master carriage to the tool bar;

band means having opposite band ends secured to the master carriage and wrapped intermediate said band ends around bearing means mounted on the ends of the tool bar to provide movement of the band means with the master carriage along said tool bar;

said tool holders mounted for movement along the tool bar and the band means between the master carriage and the end of said tool bar defining said one end portion;

third clamping means for releasably clamping each of the tool holders to the tool bar;

fourth clamping means for releasably clamping each of the tool holders to the band means; and, control means for selectively operating the drive means and each of said clamping means to position the master carriage and the tool holders on the tool bar between a stored position with the tool holders on the end portion of the tool bar and an operating position with the master carriage and at least one tool holder spaced along the tool bar away from said end portion, and to move the tool bar along the main beam between the tool storing position and an operative position with the tool bar entirely above the work space.

2. The apparatus as set forth in claim 1 including second stop means for engaging and limiting movement of the opposite end of the tool bar beyond the other end of the main beam.

3. The apparatus as set forth in claim 1 including third stop means for engaging and limiting movement of the tool holder most remote from the master carriage beyond the end of the tool bar.

4. The apparatus as set forth in claim 1 wherein said tool bar includes first and second slave carriages attached in fixed spaced relation to the tool bar and slidably attached to the main beam.

5. The apparatus as set forth in claim 4 wherein the first slave carriage is attached to the tool bar in a position to define between said first slave carriage and the end of the bar said one end portion.

6. The apparatus as set forth in claim 4 wherein the spacing between said first and second slave carriages is less than the length of the main beam.

7. A method for mounting and spacing a plurality of tool holders along a main beam, which beam spans a work table having an effective work space disposed between the ends of the beam, said method comprising the steps of:

(1) mounting a tool bar parallel to and for movement along the main beam;

(2) providing first stop means for engaging and limiting movement of the tool bar beyond one end of the beam to position one end portion of the tool bar in a tool stowing position laterally beyond the table work space;

(3) providing first clamping means for releasably clamping the tool bar to the main beam;

(4) mounting a master carriage for movement along the main beam;

(5) providing means for driving the carriage along the main beam;

(6) mounting said master carriage for movement along the tool bar in response to clamping said first clamping means and operation of said drive means;

(7) providing second clamping means for releasably clamping the master carriage to the tool bar;

(8) securing the opposite ends of a band to the master carriage and wrapping the band intermediate its ends around bearing means mounted on the ends of the tool bar to provide band movement with the master carriage along said tool bar;

(9) mounting said tool holders for movement along the tool bar and the band between the master carriage and the end of the tool bar defining said one end portion;

(10) providing third clamping means for releasably clamping each of the tool holders to the tool bar;

(11) providing fourth clamping means for releasably clamping each of the tool holders to the band;

(12) operating the drive means and each of said clamping means to position the master carriage and the tool holders on the tool bar between a stowed position with the tool holders on the end portion of the tool bar and an operating position with the master carriage and at least one tool holder spaced along the tool bar away from the end portion; and,

(13) moving the tool bar along the main beam between the tool stowing position and an operative position with the tool bar above and entirely within the work space.

* * * * *